(12) United States Patent
Ho et al.

(10) Patent No.: US 10,694,664 B2
(45) Date of Patent: Jun. 30, 2020

(54) CUTTER ASSEMBLY OF LAWNMOWER

(71) Applicant: Ping-Tzu Ho, Taichung (TW)

(72) Inventors: Ping-Tzu Ho, Taichung (TW); I-Pei Ho, Taichung (TW)

(73) Assignee: Ping-Tzu Ho, Taichung (TW)

( * ) Notice: Subject to any disclaimer, the term of this patent is extended or adjusted under 35 U.S.C. 154(b) by 0 days.

(21) Appl. No.: 16/298,105

(22) Filed: Mar. 11, 2019

(65) Prior Publication Data

US 2019/0313577 A1 Oct. 17, 2019

(30) Foreign Application Priority Data

Apr. 11, 2018 (TW) .............................. 107112369 A

(51) Int. Cl.
*A01D 34/73* (2006.01)
*A01D 34/68* (2006.01)
*A01D 101/00* (2006.01)

(52) U.S. Cl.
CPC .......... *A01D 34/733* (2013.01); *A01D 34/68* (2013.01); *A01D 2101/00* (2013.01)

(58) Field of Classification Search
CPC ...... A01D 34/733; A01D 34/68; A01D 34/90; A01D 2101/00
USPC .................................................. 30/276, 347
See application file for complete search history.

(56) References Cited

U.S. PATENT DOCUMENTS

| | | | | |
|---|---|---|---|---|
| 2,154,564 A * | 4/1939 | Eisenlohr | ............... | A01D 34/63 56/16.9 |
| 2,669,826 A * | 2/1954 | Watrous | ................. | A01D 34/63 56/13.4 |
| 3,093,948 A * | 6/1963 | Root | ...................... | A01D 34/74 56/17.1 |
| 4,823,542 A * | 4/1989 | Klever | ................. | A01D 34/001 56/12.7 |
| 6,666,009 B1 * | 12/2003 | Brandon | ............ | A01D 34/4166 30/276 |
| 7,827,771 B2 * | 11/2010 | Hishida | ................ | A01D 34/902 30/276 |
| 8,607,461 B2 * | 12/2013 | Miyahara | ............... | A01D 34/90 30/276 |
| 9,872,430 B2 * | 1/2018 | Morabit | ............ | A01D 34/4165 |
| 9,883,628 B2 * | 2/2018 | Morabit | ............ | A01D 34/4165 |
| 10,314,228 B2 * | 6/2019 | Ma | ...................... | A01D 34/4161 |
| 2008/0141542 A1 * | 6/2008 | Hung | ...................... | A01D 34/90 30/277.4 |
| 2019/0313577 A1 * | 10/2019 | Ho | ......................... | A01D 34/90 |

* cited by examiner

*Primary Examiner* — Hwei-Siu C Payer
(74) *Attorney, Agent, or Firm* — Muncy, Geissler, Olds & Lowe, P.C.

(57) ABSTRACT

A cutter assembly of lawnmower includes a base body, a fixing plate, a motor, a cutter, and a restriction assembly. The base body defines an axial direction. The fixing plate is disposed on the base body and has a first circumferential wall. A first bearing is received inside the first circumferential wall. The motor is disposed on the base body and includes a base seat, a rotor, and a rotation axle. The base seat is disposed on the base body and has a second circumferential wall. Two second bearings are received inside the second circumferential wall. The rotation axle and the rotor are linked-up and inserted through the first bearing and the second bearings.

7 Claims, 4 Drawing Sheets

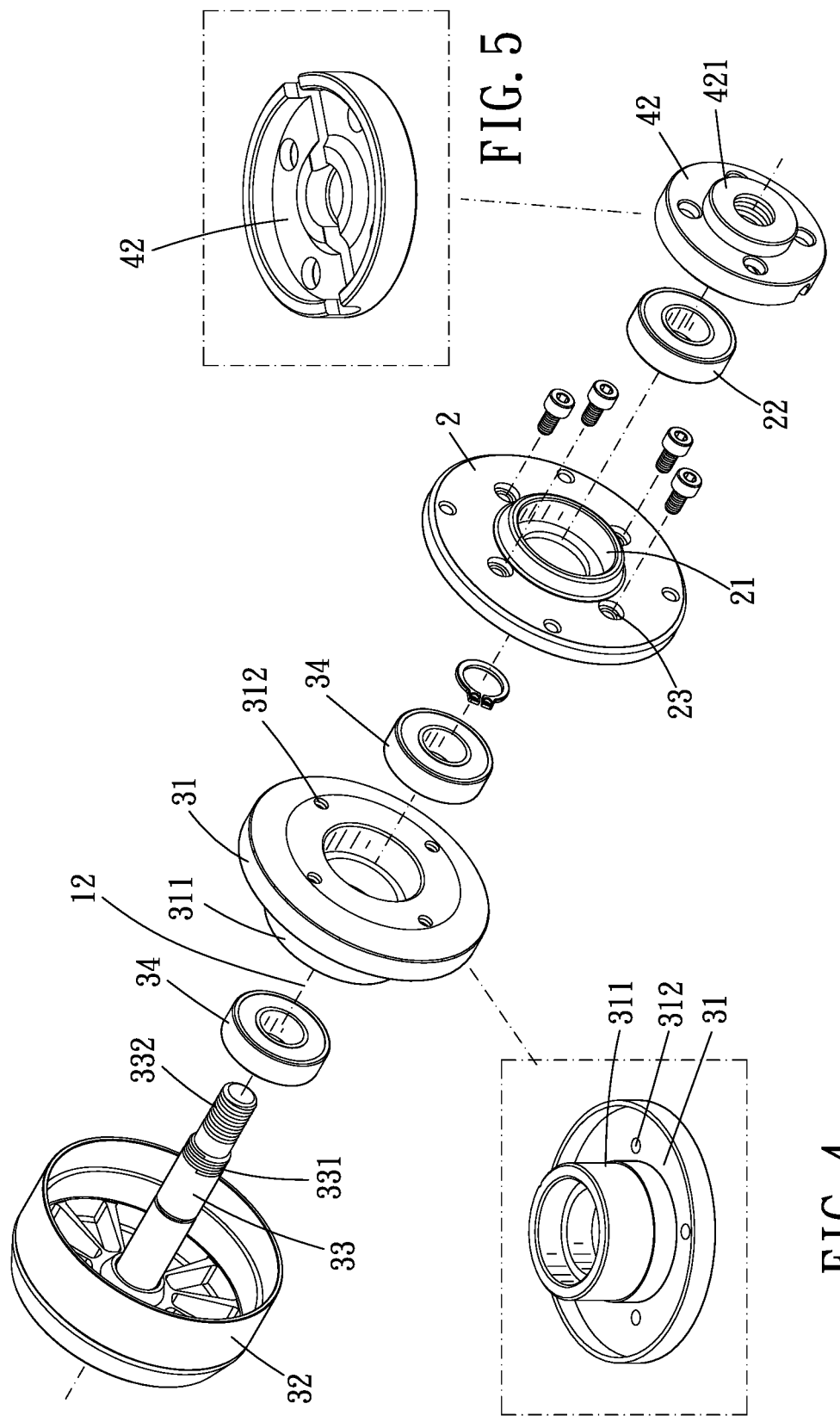

CUTTER ASSEMBLY OF LAWNMOWER

BACKGROUND OF THE INVENTION

Field of the Invention

The present invention relates to a cutter assembly of lawnmower.

Description of the Prior Art

In recent years, fuel lawnmower has been replaced by electrical lawnmower which is more eco-friendly. Electrical lawnmower is advantageous in less noise, no air-pollution, and no risk of fire due to fuel. A conventional electrical lawnmower has a base body disposed with a rotor motor. When the rotor drives the rotation axle to rotate, the rotation axle drives the cutter assembly sleeved thereonto to rotate for lawn mowing.

However, the conventional electrical lawnmower has some disadvantages. For example, when the cutter assembly touches harder object, the rotating rotation axle may deviate by the lateral force. When the rotation axle deviates, the rotor also deviates to increase the vibration of the motor. In addition, the deviated rotor may collide with other pieces in the motor to result abrasion. Thus, the motor is not durable.

SUMMARY OF THE INVENTION

The main object of the present invention is to provide a cutter assembly of lawnmower having sufficient support to prevent the rotation axle from deviation in order to make the motor more durable.

To achieve the above and other objects, the cutter assembly of lawnmower of the present invention includes a base body, a fixing plate, a motor, a cutter, and a restriction assembly.

The base body defines an axial direction. The fixing plate is disposed on the base body and has a first circumferential wall. A first bearing is received inside the first circumferential wall. The motor is disposed on the base body and includes a base seat, a rotor, and a rotation axle. The base seat is disposed on the base body and has a second circumferential wall. Two second bearings are received inside the second circumferential wall. The rotor is rotatably arranged on the base seat to be rotatable about the axial direction. The rotation axle and the rotor are linked-up and inserted through the two second bearings and the first bearings. The two second bearings are located an upper portion of the rotation axle along the axial direction. The first bearing is located at a lower portion of the rotation axle along the axial direction. The cutter is linked-up with the lower portion of the rotation axle. The restriction assembly is fixed on the rotation axle to position the cutter on the rotation axle.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is an other breakdown drawing of the present invention;
FIG. 4 is a partial stereogram of the present invention;
FIG. 5 is an other partial stereogram of the present invention.

DETAILED DESCRIPTION OF THE PREFERRED EMBODIMENTS

Figure 1:
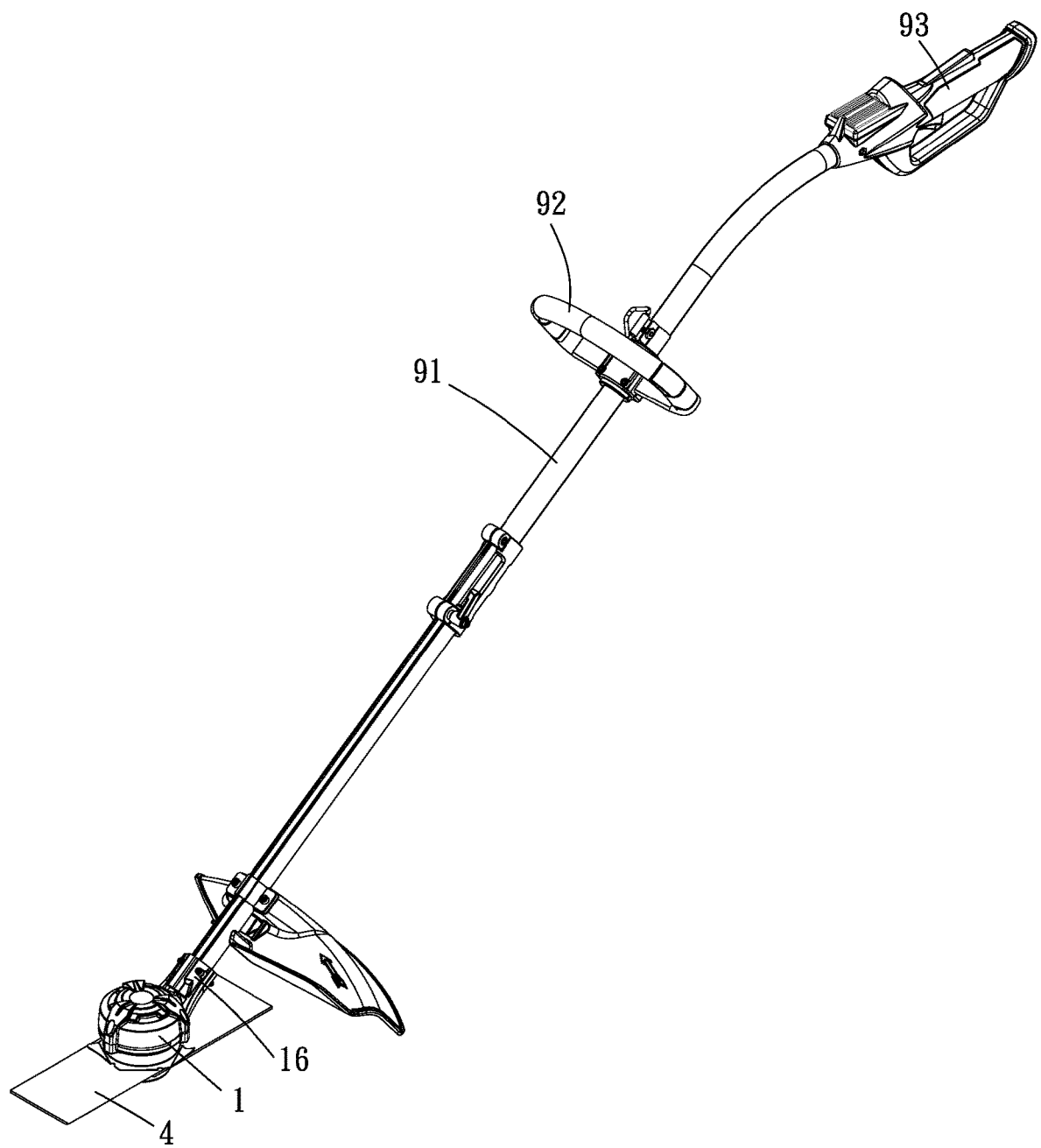
FIG. 1 is a stereogram of the present invention.
Figure 2:
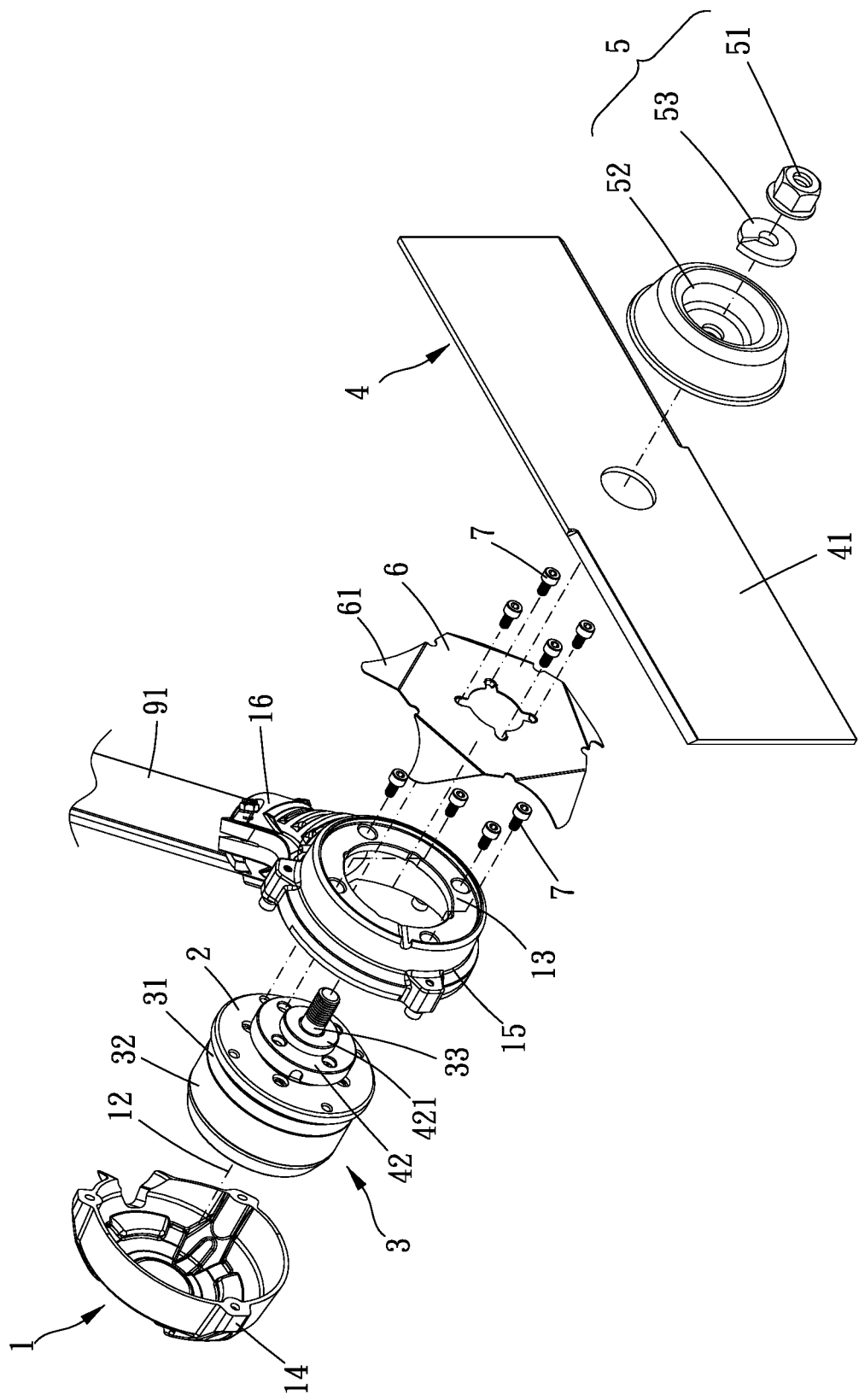
FIG. 2 is a breakdown drawing of the present invention.
Figure 6:
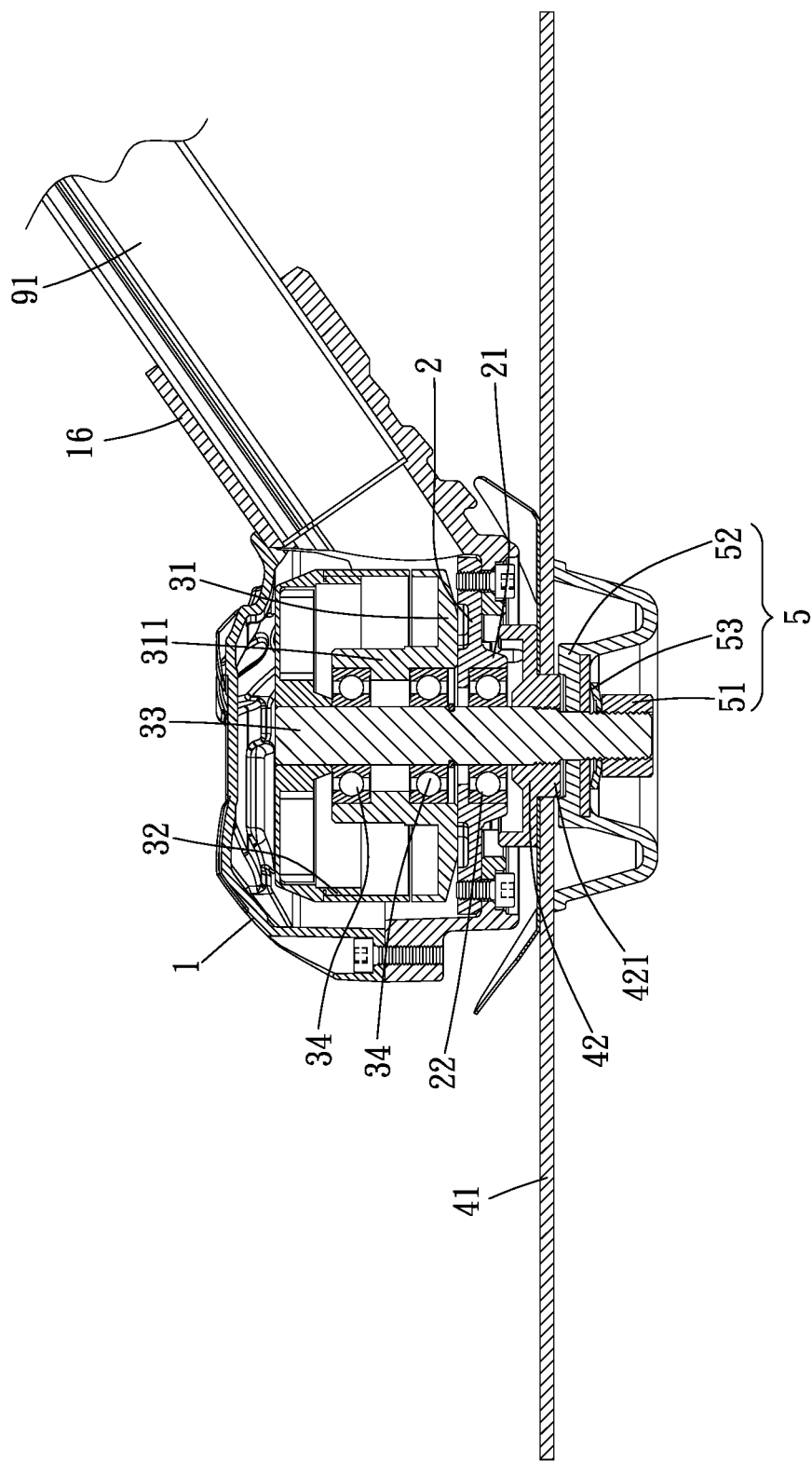
FIG. 6 is a lateral profile of the present invention.

Please refer to FIG. 1 to FIG. 6, the cutter assembly of lawnmower of the present invention includes a base body 1, a fixing plate 2, a motor 3, a cutter 4, and a restriction assembly 5.

The base body 1 defines an axial direction 12. The fixing plate 2 is disposed on the base body 1 and has a first circumferential wall 21. A first bearing 22 is received inside the first circumferential wall 21. The motor 3 is disposed on the base body 1 and includes a base seat 31, a rotor 32, and a rotation axle 33. The base seat 31 is disposed on the base body 1 and has a second circumferential wall 311. Two second bearings 34 are received inside the second circumferential wall 311. The rotor 32 is rotatably disposed on the base seat 31 and is rotatable about the axial direction 12. The rotation axle 33 and the rotor 32 are linked-up and inserted through the two second bearings 34 and the first bearing 22. The two second bearings 34 are located at an upper portion of the rotation axle 33 along the axial direction 12. The first bearing 22 is located at a lower portion of the rotation axle 33 along the axial direction 12. Because the lower portion of the rotation axle 33 is inserted though the first bearing 22, the first bearing 22 can laterally support the lower portion of the rotation axle 33 so that the rotation axle 33 is prevented from deviation. Thereby, the rotor 32 and the stator are prevented from damaging by friction. Thus, the motor 3 becomes more durable. The cutter 4 is linked-up with the lower portion of the rotation axle 33. The restriction assembly 5 is fixed to the rotation axle 33 to fix the cutter 4 on the rotation axle 33.

Specifically, the base body 1 is formed with an annular flange 13 extending inward and radially. The fixing plate 2 is fixed on a face of the annular flange 13 facing the motor 3 by a plurality of fixing members 7. The fixing plate 2 is formed with the first circumferential wall 21 away from the motor 3. The first bearing 22 is placed into inside the first circumferential wall 21 from a lower end of the first circumferential wall 21.

More specifically, the rotation axle 33 has a first threaded portion 331 and a second threaded portion 332 at the lower portion thereof along the axial direction 12. The first threaded portion 331 is located between the first bearing 22 and the second threaded portion 332. The cutter 4 is screwed with the first threaded portion 331. The restriction assembly 5 is screwed with the second threaded portion 332.

Preferably, the cutter 4 includes a blade 41 and a connecting member 42. The connecting member 42 is screwed with the first threaded portion 331 and restricts the first bearing 22 inside the first circumferential wall 21 to prevent the first bearing 22 from leaving the first circumferential wall 21. The blade 41 is sleeved onto the connecting member 42 and is nonrotatable with respect to the connecting member 42. The restriction assembly 5 restricts the blade 41 on the connecting member 42 to prevent the blade 41 from detaching from the connecting member 42 when the rotation axle 33 rotates. Besides, the connecting member 42 has a flange 421 at a side thereof remote from the motor 3. The blade 41 is sleeved onto the flange 421. In the present embodiment, the blade 41 and the flange 421 are engaged by tight-fitting. In other possible embodiments, the blade and the flange can be engaged by non-circular structure.

The cutter assembly of lawnmower can further include a cutter member 6. The cutter member 6 is sleeved onto the flange 421 and is sandwiched between the blade 41 and the connecting member 42. Furthermore, a plurality of fixing members 7 fix the cutter member 6 and the connecting member 42 together. The cutter member 6 has a plurality of cutting members 61 obliquely for cutting weed winding on the connecting member 42.

Besides, the restriction assembly 5 includes a nut 51, an abutting member 52, and a gasket 53. The abutting member 52 and the gasket 53 are sleeved onto the rotation axle 33. The nut 51 is screwed with the second threaded portion 332. The gasket 53 is sandwiched between the abutting member 52 and the nut 51. The nut 51 pushes the abutting member 52 toward the blade 41. The gasket 53 is adapted for cushion to prevent the abutting member 52 from damaging if the nut 51 directly abuts against the abutting member 52.

Preferably, the first threaded portion 331 is right handed threads, and the second threaded portion 332 is left handed threads. When the rotation axle 33 rotates along the right handed direction, the nut 51 rotates upward slightly, and the connecting member 42 rotates downward slightly. Thereby, the abutting member 52 and the connecting member 42 abut against each other tightly.

Specifically, the base body 1 includes an upper shell 14 and a lower shell 15 detachably coupled. The lower shell 15 has a connecting rod 16 at a side thereof. The annular flange 13 is arranged at the lower shell 15. The connecting rod 16 is adapted for connecting to an elongated rod 91. The elongated rod 91 has a handle 92 and a controller 93. The controller 93 is adapted for controlling the power of the motor 3.

In the present embodiment, the fixing plate 2 has a plurality of first through holes 23, and the base seat 31 has a plurality of second through holes 312. A plurality of fixing members 7 are inserted through the first through holes 23 and the second through holes 312 to fix the base seat 31 and the fixing plate 2 together.

In conclusion, the first bearing of the present invention is arranged at the lower portion of the rotation axle to laterally support the rotation axle so that the rotation axle may not deviate. Thereby, the rotor and the stator of the motor may not damage due to friction so that the motor becomes more durable.

What is claimed is:

1. A cutter assembly of a lawnmower, including: a base body, defining an axial direction; a fixing plate, disposed on the base body and having a first circumferential wall, a first bearing being received inside the first circumferential wall; a motor, disposed on the base body, including a base seat, a rotor, and a rotation axle, the base seat being disposed on the base body and having a second circumferential wall, two second bearings being received inside the second circumferential wall, the rotor being rotatably arranged on the base seat to be rotatable about the axial direction, the rotation axle and the rotor being linked-up and inserted through the two second bearings and the first bearing, the two second bearings being located an upper portion of the rotation axle along the axial direction, the first bearing being located at a lower portion of the rotation axle along the axial direction; a cutter, linked-up with the lower portion of the rotation axle; a restriction assembly, fixed on the rotation axle to position the cutter on the rotation axle; wherein the lower portion of the rotation axle along the axial direction is formed with a first threaded portion and a second threaded portion, the first threaded portion is located between the first bearing and the second threaded portion, the cutter is screwed with the first threaded portion, the restriction assembly is screwed with the second threaded portion, the cutter includes a blade and a connecting member, the connecting member is screwed with the first threaded portion to restrict the first bearing inside the first circumferential wall, the blade is sleeved onto the connecting member and is nonrotatable with respect to the connecting member, the restriction assembly positions the blade onto the connecting member; wherein the restriction assembly includes a nut, an abutting member, and a gasket, the abutting member and the gasket are sleeved onto the rotation axle, the nut is screwed with the second threaded portion, the gasket is sandwiched between the abutting member and the nut, the nut pushes the abutting member toward the blade.

2. The cutter assembly of the lawnmower of claim 1, wherein the base body is formed with an annular flange inward radially, the fixing plate is fixed on a face of the annular flange facing the motor by a plurality of fixing members, the fixing plate is formed with the first circumferential wall extending away from the motor, the first bearing is placed into the first circumferential wall from a lower end of the first circumferential wall.

3. The cutter assembly of the lawnmower of claim 2, wherein the base body includes an upper shell and a lower shell which are detachably coupled, the lower shell has a connecting rod at a side thereof, the annular flange is arranged on the lower shell.

4. The cutter assembly of the lawnmower of claim 1, wherein the connecting member is formed with a flange at a face thereof remote from the motor, the blade is sleeved onto the flange.

5. The cutter assembly of the lawnmower of claim 4, further including a cutter member, the cutter member being sleeved onto the flange and is sandwiched between the blade and the connecting member, further including a plurality of fixing members to fix the cutter member and the connecting member together, the cutter member being arranged with a plurality cutting members obliquely.

6. The cutter assembly of the lawnmower of claim 1, wherein the first threaded portion is right handed threads, the second threaded portion is left handed threads.

7. The cutter assembly of the lawnmower of claim 1, wherein the fixing plate has a plurality of first through holes, the base seat has a plurality of second through holes, a plurality of fixing members are inserted through the first through holes and the second through holes to fix the base seat and the fixing plate together.

* * * * *